(12) United States Patent
McCrary et al.

(10) Patent No.: US 8,743,131 B2
(45) Date of Patent: Jun. 3, 2014

(54) COURSE GRAIN COMMAND BUFFER

(75) Inventors: Rex McCrary, Oviedo, FL (US); Frank Liljeros, Sanford, FL (US); Gongxian Jeffrey Cheng, Toronto (CA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 307 days.

(21) Appl. No.: 12/878,519

(22) Filed: Sep. 9, 2010

(65) Prior Publication Data

US 2011/0063311 A1    Mar. 17, 2011

Related U.S. Application Data

(60) Provisional application No. 61/241,230, filed on Sep. 10, 2009.

(51) Int. Cl.
    *G06T 1/20*    (2006.01)
(52) U.S. Cl.
    USPC ........................................... 345/522; 345/503
(58) Field of Classification Search
    USPC ........................................... 345/522; 710/52
    See application file for complete search history.

(56) References Cited

U.S. PATENT DOCUMENTS

| | | | | |
|---|---|---|---|---|
| 5,396,490 A | * | 3/1995 | White et al. | 370/474 |
| 7,234,144 B2 | * | 6/2007 | Wilt et al. | 718/104 |
| 7,659,904 B2 | * | 2/2010 | Kelley et al. | 345/530 |
| 2007/0091101 A1 | * | 4/2007 | Huang et al. | 345/506 |
| 2007/0091813 A1 | * | 4/2007 | Richard et al. | 370/248 |
| 2008/0205492 A1 | * | 8/2008 | Gorday et al. | 375/150 |
| 2009/0303895 A1 | * | 12/2009 | Zhang et al. | 370/252 |

* cited by examiner

*Primary Examiner* — James A Thompson
*Assistant Examiner* — Sarah Le
(74) *Attorney, Agent, or Firm* — Sterne, Kessler, Goldstein & Fox P.L.L.C.

(57) ABSTRACT

A method for executing processes within a computer system is provided. The method includes determining when to switch from a first process, executing within the computer system, to executing another process. Execution of the first process corresponds to a computer system storage location. The method also includes switching to executing the other process based upon a time quantum and resuming execution of the first process after the time quantum has lapsed, the resuming corresponding to the storage location.

21 Claims, 5 Drawing Sheets

COURSE GRAIN COMMAND BUFFER

CROSS-REFERENCE TO RELATED APPLICATIONS

This application claims the benefit of U.S. Provisional Application No. 61/241,230, entitled Course Grain Command Buffer, filed Sep. 10, 2009, which is incorporated herein by reference in its entirety.

BACKGROUND OF THE INVENTION

1. Field of the Invention

The present invention generally relates to switching between processes in a processing unit.

2. Background Art

During operation, embedded programs within a processing unit, such as a graphics processing unit (GPU), known as software schedulers, read content, such as data packets from the GPU's command buffers to perform graphics processing tasks. The performance of these tasks routinely requires the software to switch from reading of the contents of one command buffer to begin reading, or executing, content from another command buffer. Conventional GPUs, however, cannot efficiently switch from one process to another, and then resume the earlier process. This switching inefficiency produces system latencies, ultimately resulting in slower system performance and reduced user control.

What is needed, therefore, are methods and systems to efficiently enable software schedulers to determine which command buffers' content should be read, and to efficiently switch between these various buffers and processes. What are also needed are methods and systems to reduce system latency and increase the control of scheduling to a program running on the GPU.

BRIEF SUMMARY OF EMBODIMENTS OF THE INVENTION

The present invention meets the above-described needs. For example, an embodiment of the present invention provides a means to preempt the source stream on a GPU on a command boundary, save that state away, commence another process behind it, and resume the original process later.

An embodiment of the present invention includes a method for executing processes within a computer system. The method includes determining when to switch from a first process, executing within the computer system, to executing another process. Execution of the first process corresponds to a computer system storage location. The method also includes switching to executing the other process based upon a time quantum and resuming execution of the first process after the time quantum has lapsed, the resuming corresponding to the storage location.

Embodiments of the present invention provide mechanisms for efficiently tracking, storing, and restoring locations of processes occurring within a processing unit's command buffer. These mechanisms enable a command processor to essentially stop the execution of a process, in the middle of a command buffer, begin execution of a different process, return to the same location in the command buffer, and resume executing the earlier process. As a result, the command processor can switch from one task, such as processing a lower priority process, to another task, such as processing a higher priority process with significantly reduced pre-emption times, reduced system latency, and greater user control.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF EMBODIMENTS OF THE INVENTION

Embodiments of the present invention enable substantially improved utilization of resources in a processing unit, such as a GPU. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention can be used in any computer system or computing device having at least two processors, such as a CPU that provides work items (e.g., commands or command buffers) and a GPU that processes work items provided by the CPU. For example and without limitation, embodiments may include computers including laptop computers, personal computers, game platforms, entertainment platforms, personal digital assistants, and video platforms.

In systems having a CPU and a GPU, the utilization of the GPU is a significant factor in overall system performance. Ideally, one would desire to have the GPU utilization at or near maximum. The CPU provides the instructions and data that are used in the GPU. In conventional systems, the CPU provides substantially all of the instructions and data to the GPU via command buffers. The GPU receives the command buffers as one or more inputs, and executes their content.

A command buffer is a data structure containing instructions, or commands, along with associated data. In conventional systems, prioritization of the command buffers was performed by the CPU. The GPU simply executed the commands that were queued and prioritized by the CPU, in the order specified by the CPU. Embodiments of the present invention facilitate greater GPU autonomy, reducing the GPU's dependency on the CPU's prioritization of work to be executed.

For example, embodiments of the present invention enable the GPU to perform the prioritization and scheduling of commands. More specifically, the GPU can prioritize commands queued for execution by the CPU based on its local resource availability. This approach is more dynamic and efficient than CPU prioritization approaches. Furthermore, the GPU can perform a second level of prioritizing beyond CPU specified command prioritization.

Embodiments of the present invention enable command processors within the GPU, on a packet boundary, to decide to preempt or change the source stream on a GPU. This preemption decision is based upon priorities. For example, the software may recognize that a particular command buffer, within the GPU, has been running a particular process too long or that its processing time has expired. Under these conditions, embodiments of the present invention provide an approach to switch between these processes within the GPU, such that software within the GPU performs the scheduling.

To accomplish this, the program writes to its own copy of the command buffers. The software scheduler then decides which command buffer (of a particular program or process) should be run next. An example is provided below.

Figure 1:
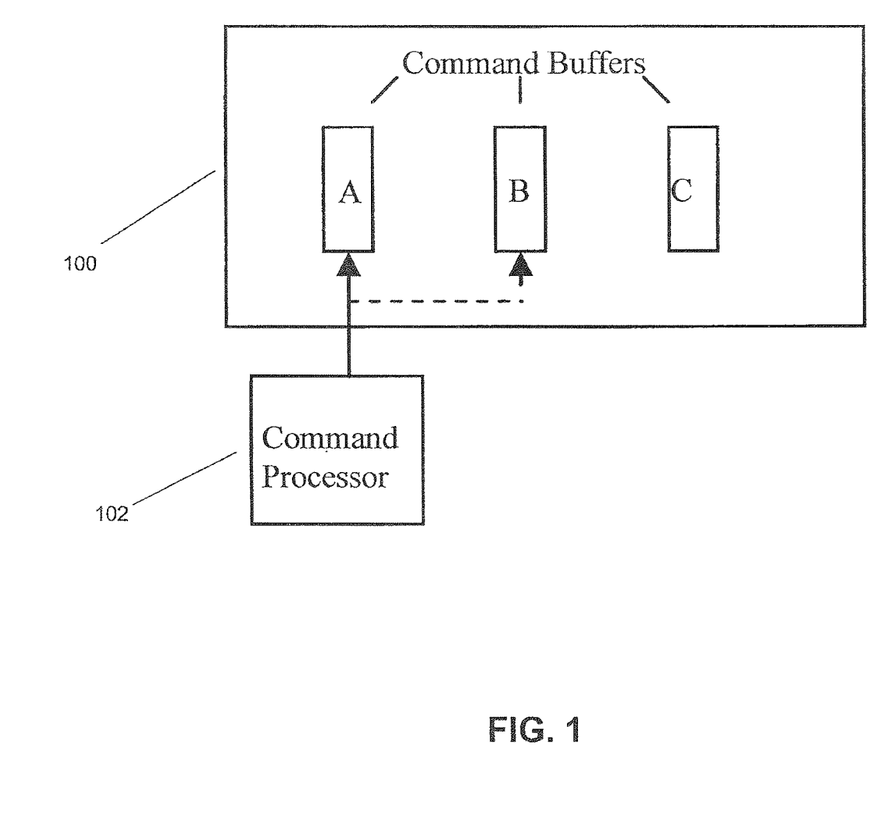
FIG. 1 is a block diagram illustration of an exemplary GPU memory including command buffers A, B, and C, in accordance with embodiments of the present invention.

FIG. 1 is an exemplary illustration of a memory 100 including command buffers A, B, and C, coupled to a command processor 102 in accordance with embodiments of the present invention. The memory 100 and the processor 102 are components typically included within the architecture of a processor memory, such as a GPU.

In example of FIG. 1, the command processor 102 reads from the command buffer A in accordance with user instructions. In this arrangement, the command processor 102 may decide that it will cease reading from the command buffer A and instead, transition to and begin reading from the command buffer B. To facilitate this transition, the command processor 102 is configured to track and monitor the precise command buffer it is processing (e.g., buffer A). It can also track and monitor particular locations within the command buffer its processing. This tracking and monitoring enables the command processor 102 to know where to begin upon resumption of its processing of the contents of buffer A.

To accomplish this, the command processor 102 saves state information of the GPU in a separate memory location to be able to recreate the state of the GPU, or device, upon resume. In this manner, this process preserves precise knowledge of where to begin and knowledge of the state of the GPU or device. The save operation includes two aspects:
(1) It saves program written state data in real time; and
(2) Saves hardware state after the device is idle (or after the process has been Flushed). In practice, the device does not have to be completely idle. It is desirable, however, that the particular process be completed and pushed out of the GPU.

This hardware "state save" includes the pointers necessary to perform the saving or tracking mentioned above, with reference to FIG. 1.

Another feature of the example of FIG. 1 is an ability to flush all cached data in the GPU so that all command buffers in memory can be saved and restored upon resume.

With reference to the embodiment of the present invention illustrated in FIG. 1, it was noted that a command processor within the GPU decides whether to preempt, or change, the source stream based upon priorities. The source of these priorities can originate in software (i.e., software based scheduling). This software based scheduling routine, discussed more fully below, produces the input to switch from one process to another, one ring to another, one queue to another, or one buffer to another.

In software based scheduling, switching occurs when the scheduling routine determines that either a particular process has run long enough, a particular time quantum (i.e., timing threshold) has lapsed, or when other tasks now require attention. These are only a few of the factors that that can be considered. It will be appreciated by one of skill in the art, however, that switching can also occur because of other factors. When one or more of these factors occurs, the scheduling routine instructs the command processor 102 to switch between the command buffers A, B, and C. In this manner, the embodiment of FIG. 1 is an illustration of software controlled switching between processes within the GPU.

Figure 2:
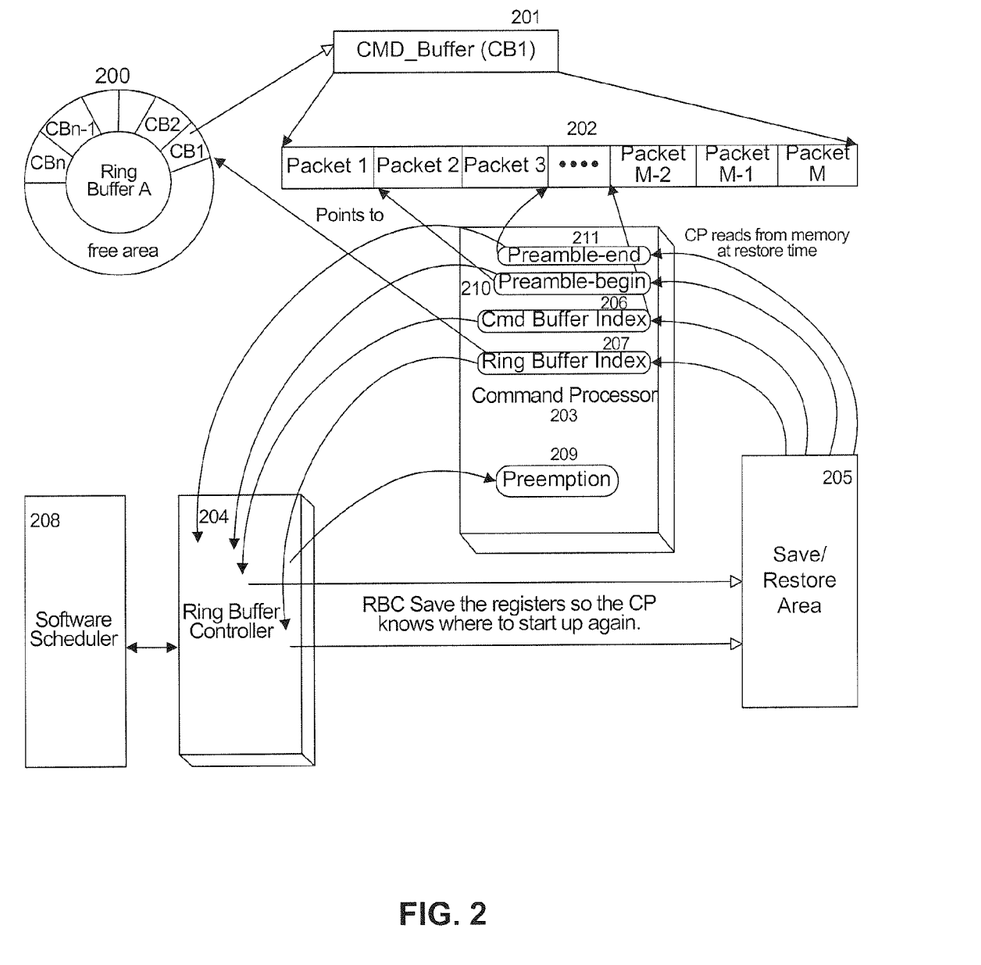
FIG. 2 is a more detailed block diagram illustration of a GPU memory, along with additional GPU components, constructed and arranged in accordance with embodiments of the present invention.

FIG. 2 is a more detailed block diagram illustration of an exemplary GPU memory, along with additional GPU components, constructed and arranged in accordance with embodiments of the present invention.

As noted above, embodiments of the present invention provide mechanisms for efficiently tracking, storing, and restoring locations of processes occurring within a command buffer. These mechanisms enable a command processor to stop the execution of one process (e.g., in the middle of a command buffer), begin execution of a different process, return to the same location in the command buffer, and resume execution of the earlier process. More specifically, the command processor can switch, for example, from processing a lower priority process to processing a higher priority process with significantly reduced pre-emption times.

In the example of FIG. 2, a ring buffer A 200 includes individual command buffers CB1 (201) to CBn. Ring buffer A 200 is included within the GPU's system memory. Command buffer (CB1) 201, for example, stores packets 202 (e.g., packets 1 through M) for processing.

The GPU also includes execution units, such as a command processor 203, ring buffer controller 204, a save/restore area 205, and a software scheduler 208. The command processor 203, among other tasks well known to those of skill in the art, fetches ring packets, such as the packets 1-M, which can point to a command buffer, such as the command buffer CB1 201. The command processor 203 also records driver written state information to the save/restore area 205.

The ring buffer controller 204 informs the command processor 203 which ring buffer to process. In the example of FIG. 2, the command processor 203 is illustrated as it processes contents from the ring buffer A 200. The command processor 203 could also process contents from additional ring buffers (not shown). The ring buffer controller 204 receives its instructions from the software scheduler 208.

The exemplary command processor 203 of FIG. 2 includes a command buffer index 206, a ring buffer index 207, a preemption index 209, a preamble-begin index 210, and a preamble-end index 211. The command processor 203 records the command buffer index 206, the ring buffer index 207, the preamble-begin index, 210, and the preamble-end index 211 continuously and automatically.

An arrow from the ring buffer index 207 to the ring buffer A 200 indicates the beginning of an area within the command buffer CB1 201 that has not yet been read. More specifically, the ring buffer index 207 cannot advance from the beginning of the command buffer CB1 201 (i.e., the unread area) to CB2 until the processing of the contents of CB1 201 has concluded. To facilitate this advancement, the command processor 203 is configured to be able to return to the correct location within the ring buffer A 200 (e.g., CB1 201) if the reading of the ring buffer A 200 ceases for some reason.

The command processor 203 processes CB1 201 until the ring buffer controller 204 requests that it to stop processing the ring buffer A 200. This process is known as preemption and is facilitated by the preemption index 209. Preemption can occur, for example, when the command processor 203 is requested to process a task having a priority higher than the task currently being processed. When the command processor 203 reports that all processing, up to the point of preemption, has concluded, it informs the ring buffer controller 204.

By way of example, an arrow from the command buffer index register 206 points to a location, within the command buffer CB1 201, currently being processed. There is also an input from the ring buffer controller 204 to the preemption index 209 indicating the need to switch from the ring buffer A 200 to another ring buffer, or to another command buffer within the ring buffer A 200.

When processing within the command processor 203 ceases, the ring buffer controller 204 reads the related indexes, as indicated by arrows from ring buffer controller 204 to save/restore area 205. In the exemplary embodiment of FIG. 2, when the command processor 203 resumes operations, it restores these operations from the save/restore area 205.

The illustration of FIG. 2 represents an embodiment of the present invention where software provides control via the software scheduler 208, to the ring buffer controller 204. Thus, in the embodiment of FIG. 2, the ring buffer controller 204 is more or less a slave, making few decisions on its own. In an alternative embodiment, discussed in greater detail below, a hardware scheduling mechanism is provided, enabling the ring buffer controller to perform more of a master role.

As noted above, the ring buffer controller 204 controls switching from one process to another (i.e., one ring buffer to another). The ring buffer controller 204 reads registers within the command processor 203 and writes this content back to the command processor 203 at restore time. This process enables the command processor 203 to specifically know what ring buffer (and where within that particular ring buffer) to read from. More specifically, when the command processor 203 recognizes that the command buffer index associated with the command buffer it was just reading (e.g. CB1 201) is a non-zero value, it knows that its reading of this buffer has not concluded. It therefore resumes reading from the next location within this buffer, upon resume.

Also included in the command processor 203 is the preamble-begin index 210, and the preamble-end index 211. These preamble indexes are also referred to as set-up indexes, or registers.

By way of background, commands stored within the command buffers typically include preambles that can be used, for example, for set-up. Preamble, or set-up, indexes are used because the GPU's software drivers place multiple software clients or processes within the same command buffer. Each of these clients and processes has a unique preamble including a beginning portion and an ending portion. The preamble-begin index 210 and the preamble-end index 211 track the beginning and ending of these various preambles.

In the example of CB1 201 of FIG. 2, a preamble associated with a first software client at the beginning of packet 1 can include a set-up representing draws or other specific operations to perform. Packet 3, for example, can include a different preamble for a new software client. The ring buffer controller 204 dynamically tracks the beginning and ending of the preambles for packet 1 and packet 3 in real-time using the preamble-begin index 210 and the preamble-end index 211. The real-time availability to dynamically track multiple preamble beginnings and preamble endings provides the flexibility of handling multiple process owners within a single command buffer. In this example, the command processor 203 remembers when a final draw from the CB1 201 has finished based upon information within the command buffer index 206 (see arrow pointing from the command buffer 206).

As known by those of skill in the art, conventional GPU systems (e.g., command processors) have an ability to perform rolling preamble begin and preamble end execution, but not tracking. That is, these conventional systems can execute sets of preamble begin/ends as they occur within the command buffer. These systems can also track and record preamble begin and ends associated with a second set when that second set is processed. Embodiments of the present invention, however, not only execute, but also track the initial preamble of the command buffer, along with subsequent preamble begin and ends within the command buffer.

Embodiments of the present invention, as illustrated in FIG. 2, can apply to many different types of preamble categories. One particularly relevant category is illustrated in the example of a draw call associated with a specific software client. In this first category, there is a particular initialization state that this software client desires the GPU have as a base. Then, prior to each of these draw calls, the command buffer may signal that it desires to assign one value to a first register and another value to a different register. Thus, associated with this particular draw call there is a delta from the base or initialization, or an incremental state. There is also a preamble, associated with this draw call, that indicates that this is what the base of the entire GPU should resemble. This preamble provides an ability to incrementally change the state for each draw call.

Referring back to the example of FIG. 2, the ring buffer controller 204 reads from preamble-begin index 210 and the preamble-end index 211 and writes those out to the save/restore area 205. The ring buffer controller 204 then reprograms the command processor 203 to fetch from another ring buffer, or another command buffer with a particular ring buffer, based upon other information included within the save/restore area 205.

FIGS. 1 and 2 are directed to software controlled switching. In an alternative embodiment, however, hardware can control the switching. In this alternative embodiment, for example, a CPU program writes to the command buffers A, B, and C. Although the CPU program writes to the command buffers under the hardware controlled approach, the GPU continues to control the prioritization, monitors the buffers, and determines what processes should be executed next. This alternative embodiment is referred to as hardware based scheduling, and is discussed in greater detail below, with reference to FIG. 3.

Figure 3:
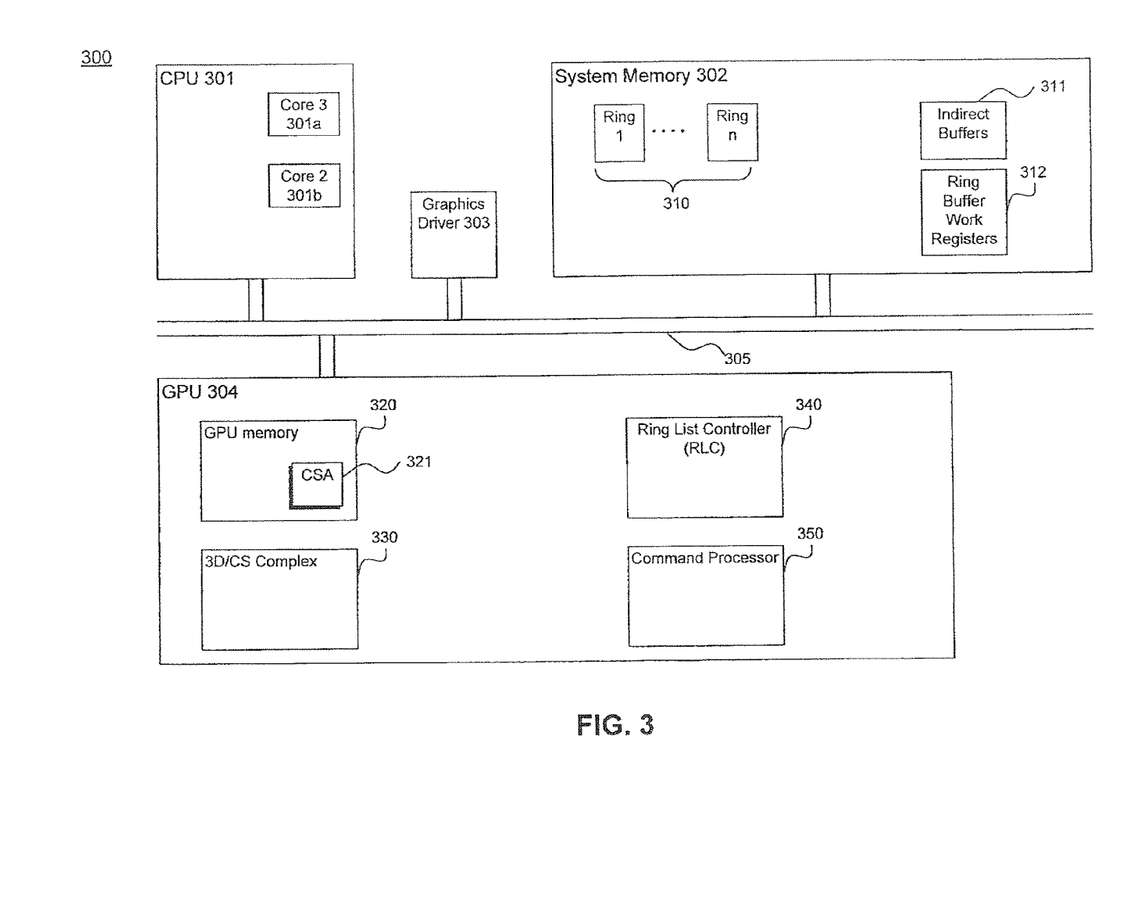
FIG. 3 illustrates a system in which work items (e.g., commands) are executed on a GPU, according to an embodiment of the present invention.

FIG. 3 is an exemplary illustration of a system 300 in which work items (e.g., commands) are executed on a GPU, according to an embodiment of the present invention. More specifically, FIG. 3 is illustration of a system configured to implement hardware based scheduling in accordance with embodiments of the present invention.

The system 300 includes a CPU 301, a system memory 302, a graphics driver 303, GPU 304, and communication infrastructure 305. A person of skill in the art will appreciate that system 300 may include software, hardware, and firmware components in addition to, or different from, that shown in the embodiment shown in FIG. 3.

CPU 301 can be any commercially available CPU, a digital signal processor (DSP), application specific integrated processor (ASIC), field programmable gate array (FPGA), or a customized processor. CPU 301 can comprise of one or more processors coupled using a communication infrastructure, such as communication infrastructure 305. CPU 301 can also include one or more processors that have more than one processing core on the same die such as a multi-core processor.

In the embodiment of FIG. 3, CPU 301 can be a dual core processor having processing cores core 1 (301) and core 2 (301*b*). CPU 301 executes an operating system (not shown) and one or more applications, and is the control processor for system 300. The operating system executing on CPU 301 controls and facilitates access to devices in system 300. One or more applications executing on CPU 301, including user applications, cause CPU 301 to coordinate the use of various devices of system 300, including GPU 104 and system memory 302, to accomplish the tasks.

System memory 302 includes one or more memory devices. Typically, system memory 302 can be a dynamic random access memory (DRAM) or a similar memory device used for non-persistent storage of data. In some embodiments, system memory 302 can include a memory device such as a flash memory device and or static RAM (SRAM) device. During execution of system 300 in an embodiment, system memory 302 can have residing within it, one or more memory buffers 310 through which CPU 301 communicates commands to GPU 304.

Memory buffers 310 through which CPU 301 communicates commands to GPU 304 can be implemented as ring buffers or other data structure suitable for efficient queuing of work items. In the following memory buffers 310 are referred also to as ring buffers 310. Commands from CPU 301 to GPU 304 can include instructions and data. In some embodiments, data structures having instructions and data are input to a ring buffer 310 by an application and/or operating system executing on CPU 301. CPU 301 (or an application and/or operating system executing on CPU 301) can specify a priority associated with one or more ring buffers 310. Commands may be added to a ring buffer based on a determined priority level of each command. For example, CPU 301 may define one ring buffer each for a high priority commands, low priority commands, and low latency commands.

A set of indirect buffers 311 may be used to hold the actual commands (e.g., instructions and data). For example, when CPU 301 communicates a command buffer to the GPU 304, the command buffer may be stored in an indirect buffer 311 and a pointer to that indirect buffer can be inserted in the ring buffer of the corresponding priority level. It should be noted that indirect buffers 311 can be implemented to enable either a single level of indirection or multiple levels of indirection.

Ring buffer work registers 312 can be implemented in system memory 302 or in other register memory facilities of system 300. Ring buffer work registers 312 provide, for example, communication between CPU 301 and GPU 304 regarding commands in ring buffers 310. For example, CPU 301 as writer of the commands to ring buffers 310 and GPU 304 as reader of such commands may coordinate a write pointer and read pointer indicating the last item added, and last item read, respectively, in ring buffers 310. Other information such as list of available ring buffers 310, priority ordering specified by CPU 301, can also be communicated to GPU 304 through ring buffer work registers 312.

Graphics driver 303 can comprise software, firmware, hardware, or any combination thereof. In an embodiment, graphics driver 303 is implemented entirely in software. During the execution of system 300, graphics driver 303 software can reside in system memory 302. Graphics driver 303 provides an interface and/or application programming interface (API) for the CPU 301 and applications executing on CPU 301 to access GPU 304. Generally, when system 300 comes up the operating system initializes the graphics driver 303 as appropriate for the particular GPU 304.

GPU 304 provides graphics acceleration functionality and other compute functionality to system 300. GPU 304 can include a plurality of processors, such as single instruction multiple data (SIMD) processors including processing elements such as arithmetic and logic units (ALU). Having multiple SIMD processors, in general, makes GPU 304 ideally suited for execution of data-parallel tasks such as is common in graphics processing. For example, when rendering an image on a display, the same or substantially the same instructions are executed on each pixel that is rendered on the display.

GPU 304 can also be used for tasks other than graphics operations, such as various compute intensive tasks that can benefit from parallel execution of data streams. In the description below, graphics applications are used for ease of description. A person of skill in the art will, however, recognize that the teachings herein are applicable to numerous other tasks that can be executed on a graphics processor. Also, as will be understood by those of ordinary skill in the art, GPU 304 could be logic embedded in another device such as CPU 301, a bridge chip (such as a northbridge, southbridge or combined device) or the like.

GPU 304 comprises components including a GPU memory 320, a 3-dimension/compute shader complex (3D/CS complex) 330, a ring list controller (RLC) 340, and command processor 350. GPU memory 320 provides a local memory for use during computations in GPU 304, and may include DRAM or such memory device. In an embodiment, GPU 320 includes a plurality of context save areas (CSA) 321. Each CSA provides a memory area for saving the context of work items that are swapped out of execution in GPU 304 before completion as described below.

3D/CS complex 330 is the main computation component within GPU 304, and comprises of a plurality of SIMD processors that facilitates computations including computations on parallel data streams. 3D/CS complex, for example, can include vertex shaders, pixel shaders, geometry shaders, unified shaders, and other components necessary for data computation in GPU 304. In embodiments described below, 3D/CS complex can be considered as comprising 3D computation components, compute shader components, and low latency computation components. The commands sent to the GPU 304 from CPU 301 are implemented using the 3D/CS complex.

Ring list controller (RLC) 340 includes functionality to coordinate the access to memory buffers (such as ring buffers 310). In an embodiment, RLC 340 determines the list of ring buffers 340 that is to be processed in GPU 304, receives any priority ordering of ring buffers 340 specified by CPU 301 (more specifically a process or operating system executing on CPU 301), and determines the scheduling of the ring buffers on GPU 304 in a manner that optimizes the utilization of processing resources in GPU 304. For example, RLC 340 together with command processor 350 can schedule the ring buffers received from CPU 301 in a manner that keeps each SIMD processor in 3D/CS complex 330 at or near maximum utilization.

Command processor 350 controls the processing within GPU 304. Command processor receives instructions to be executed from CPU 301, and coordinates the execution of those instructions on GPU 304. In some instances, command processor may generate one or more commands to be executed in GPU 304, that corresponds to each command received from CPU 301. In an embodiment, command processor 350 together with RLC 340 implements the prioritizing and scheduling of commands on GPU 304 in a manner that maximizes the utilization of GPU 304 resources.

Logic instructions implementing the functionality of the command processor 350 and RLC 340 can be implemented in hardware, firmware, or software, or a combination thereof. In one embodiment, command processor 350 is implemented as a RISC engine with microcode for implementing logic including scheduling logic.

Communication infrastructure 305 provides coupling to devices and components of system 300. Communication infrastructure 305 can include one or more communication buses such as Peripheral Component Interconnect (PCI), Advanced Graphics Port (AGP), and the like.

Figure 4:
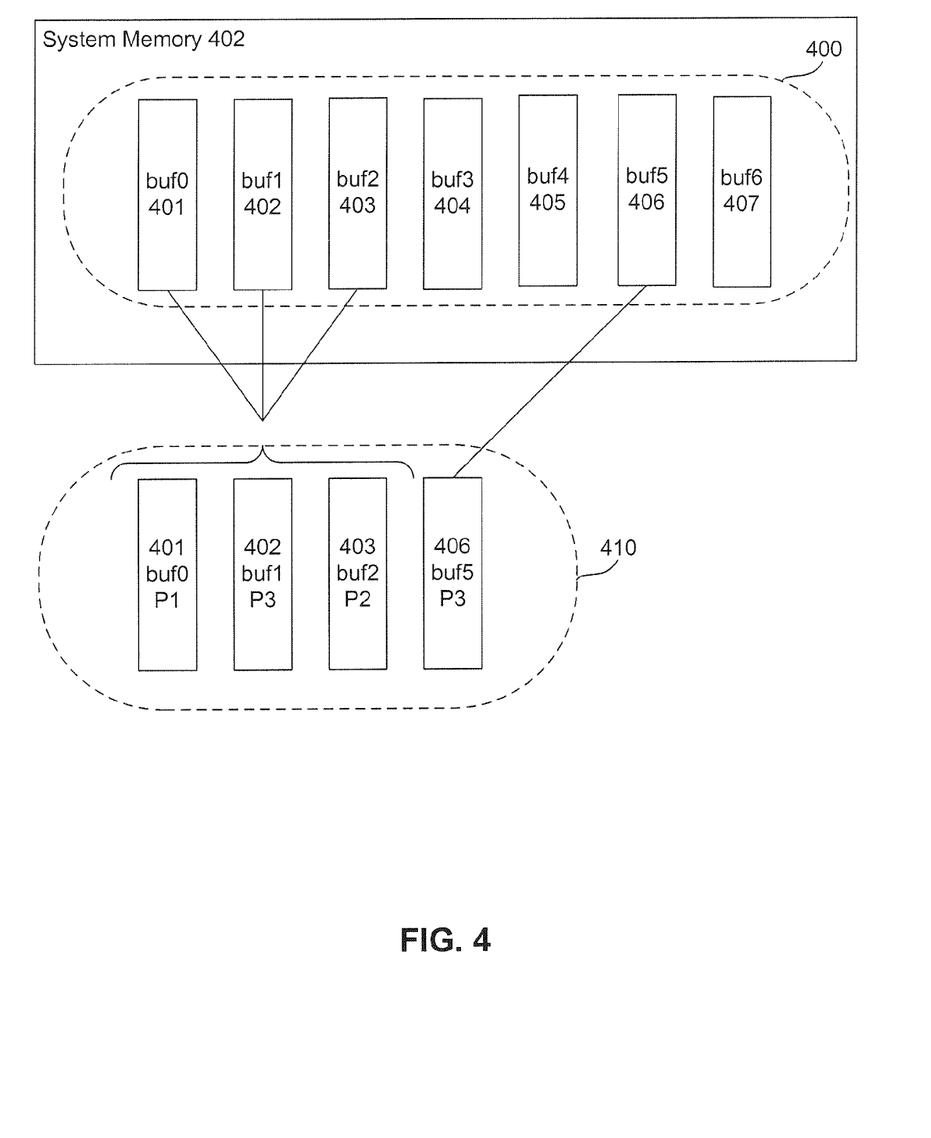
FIG. 4 is an illustration of example ring buffer allocation, according to an embodiment of the present invention.

FIG. 4 is an exemplary illustration of ring buffers communicated from CPU 301 to a GPU 304. In the example shown, at an instant during the operation of system 300, System memory 302 has configured within it a set 400 of ring buffers, that include ring buffers 0 ... 6 (i.e., 401, 402, 403, 404, 405, 406, 407). Of the set 400, GPU 304 accesses a subset 410 that include ring buffer 0 (401), ring buffer 1 (402), ring buffer 2 (403), and ring buffer 5 (406).

A subset 410 may be selected based on the criteria specified by CPU 301 of FIG. 3. For example, the CPU 301 can identify subset 410 as having commands ready to be executed on GPU 304. After enqueuing one or more commands to each ring buffer 401, 402, 403, and 406, CPU 301 can update one or more memory locations, such as a location in ring buffer work registers 312, which is read by GPU 304.

In another embodiment, upon writing one or more commands to one or more ring buffers, CPU 301 can directly write into a register within GPU 304 notifying GPU 304 that command buffers are available for processing.

GPU 304 periodically monitors the ring buffers in system memory 302, ring buffer work registers in system memory, and/or other register locations that are updated by CPU 301 to determine if any ring buffers have command buffers that are ready to be processed by GPU 304. Upon detection that one or more ring buffers have command buffers ready to be executed GPU 304 can receive the command buffers for execution. In an embodiment, GPU 304 may use direct memory access (DMA) or the like to receive the ring buffers specified by the CPU 301 into GPU local memory or into a set of general purpose registers (GPR). The RLC 340 may perform the monitoring of the ring buffers and control the transfer of the ring buffers to GPU memory and/or GPR.

Having determined the set of ring buffers to be executed on GPU 304, RLC 340 determines the allocation of the ring buffers to GPU, the prioritization of the ring buffers, and prioritizations of the command buffers within the ring buffers. In some embodiments, the determination of prioritizations is performed by RLC 340 in coordination with command processor 350.

For example, in the subset 410 of ring buffers received for execution on GPU 304, a priority ordering as shown of ring buffer 0 as priority level 1, ring buffer 2 as priority level 2, and ring buffers 1 and 5 as priority level 3 may be determined, based on the prioritizations determined by CPU 301 and prioritization determined by GPU 304.

Figure 5:
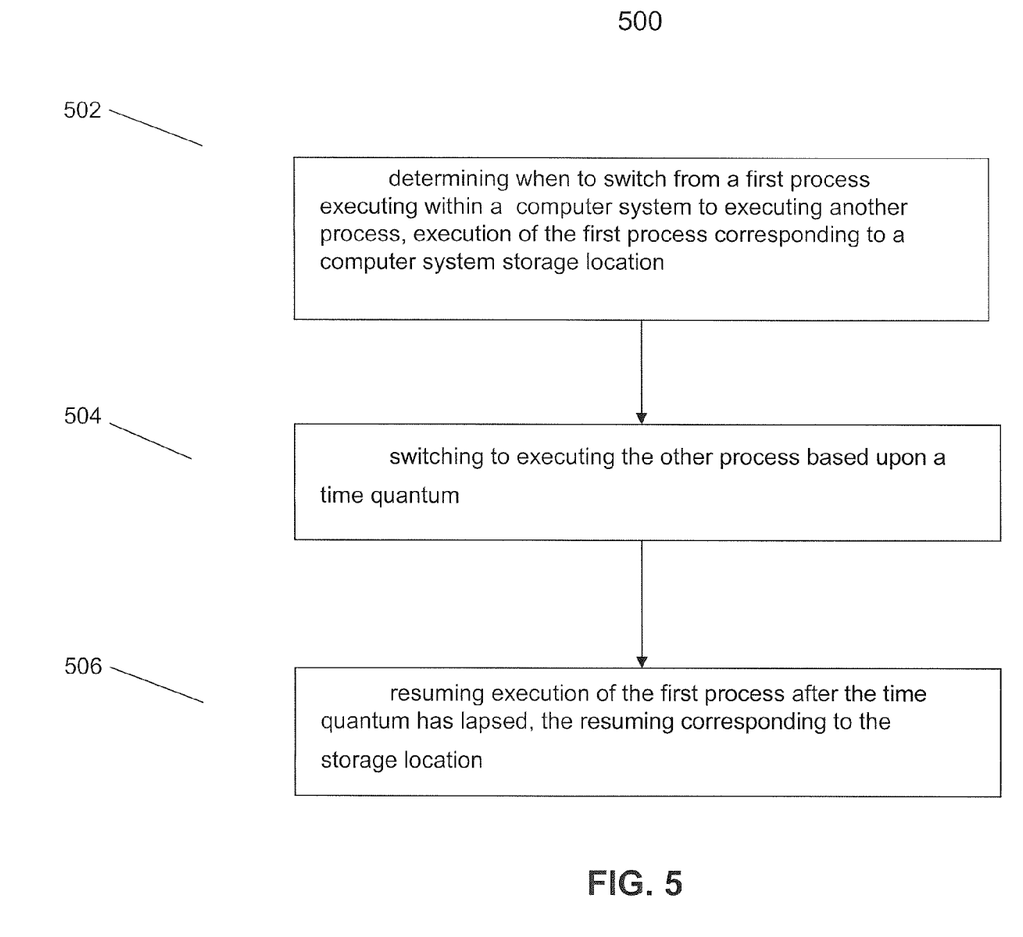
FIG. 5 is a flow chart of an exemplary method of practicing an embodiment of the present invention.

FIG. 5 is a flow chart of an exemplary method 500 for executing processes within a computer system. In step 502, a determination is made when to switch from a first process executing within the computer system to executing another process, wherein execution of the first process corresponds to a computer system storage location. In step 504, the method stitches to executing the other process based upon a time quantum. In step 506, execution of the first process resumes after the time quantum has lapsed, wherein the resuming corresponds to the storage location.

Aspects of the present invention can be stored, in whole or in part, on a computer readable media. The instructions stored on the computer readable media can adapt a processor to perform the invention, in whole or in part.

Conclusion

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It should be noted that the simulation, synthesis and/or manufacture of the various embodiments of this invention can be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and intranets. It is understood that the functions accomplished and/or structure provided by the systems and techniques described above can be represented in a core (such as a GPU core) that is embodied in program code and can be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:
1. A method comprising:
associating, by a processing unit, a plurality of processes with corresponding respective data packets and multiple preambles;
dynamically tracking, by the processing unit, a plurality of indexes during the execution of a first process, the plurality of indexes including a beginning index and an end index of each of the multiple preambles, a command buffer index, a ring buffer index, and a preemption index;

determining, by the processing unit, when to switch from execution of the first process within the computer system to executing a second process based on the preemption index;

preempting, by the processing unit, execution of the first process for the second process;

determining, by the processing unit, a location of the first process at the preempting based on the beginning index, the end index, the command buffer index, and the ring buffer index;

storing, by the processing unit, the location;

switching, by the processing unit, to executing the second process based upon a time quantum; and resuming, by the processing unit, execution of the first process after the time quantum has lapsed, the resuming based on the stored determined location, wherein the processing unit comprises at least one processor and memory.

2. The method of claim 1, further comprising using first and second processors as the at least one processor.

3. The method of claim 1, further comprising using command buffers to store program written state data and hardware state data.

4. The method of claim 3, wherein the program written state data is saved in real time.

5. The method of claim 4, wherein the determining is performed via software scheduling.

6. The method of claim 4, wherein the determining includes deciding whether a priority of the second process is higher than a priority of the first process.

7. The method of claim 6, wherein the executing the second process includes ceasing execution of the first process.

8. The method of claim 7, wherein the resuming execution of the first process includes ceasing execution of the second process.

9. The method of claim 8, wherein the resuming includes recreating a previous state of the GPU based upon data saved in the storage location.

10. The method of claim 1, wherein the tracking of the beginning and the end of each of the different preambles occurs simultaneously.

11. The method of claim 1, wherein the tracking comprises:
tracking a plurality of command buffers included in a ring buffer using the ring buffer index; and
tracking processing within the plurality of command buffers using the command buffer index.

12. The method of claim 1, wherein the command buffer index indicates a beginning of an unread area of a first command buffer of the plurality of command buffers, such that the ring buffer index advances to a second command buffer in response to processing of the first command buffer being complete.

13. A non-transitory computer readable media storing instructions which, when executed by a processing unit cause the processing unit to perform operations comprising:
associating a plurality of processes with corresponding respective data packets and multiple preambles;
dynamically tracking a plurality of indexes during the execution of a first process, the plurality of indexes including a beginning index and an end index of each of the multiple preambles, a command buffer index, a ring buffer index, and a preemption index;
determining when to switch from execution of the first process within the computer system to executing a second process based on the preemption index;
preempting execution of the first process for the second process;
determining a location of the first process at the preempting based on the beginning index, end index, the command buffer index, and the ring buffer index;
storing the location;
switching to executing the second process based upon a time quantum; and
resuming execution of the first process after the time quantum has lapsed, the resuming based on the stored determined location.

14. The non-transitory computer readable media of claim 13, wherein the determining is performed via software scheduling.

15. The non-transitory computer readable media of claim 14, wherein the determining includes deciding whether a priority of the second process is higher than a priority of the first process.

16. The non-transitory computer readable media of claim 15, wherein the executing, the second process includes ceasing execution of the first process.

17. The non-transitory computer readable media of claim 16, wherein the resuming execution of the first process includes ceasing execution of the second process.

18. The non-transitory computer readable media of claim 17, wherein the resuming includes recreating a previous state of the processing unit based upon data saved in the storage location.

19. A computer system, comprising:
two or more command buffers for storing respective commands awaiting execution;
a command processor configured to execute the stored commands of:
associating a plurality of commands with corresponding respective data packets and multiple preambles and
dynamically tracking a plurality of indexes during the execution of a first command, the plurality of indexes including a beginning index and an end index of each of the different multiple preambles, command buffer index, a ring buffer index, and a preemption index; and
a buffer controller coupled to the command processor;
wherein the buffer controller is configured to:
notify the command processor when to switch from executing the first command to executing a second command based on the preemption index,
preempt execution of the first command for the second command,
determine a location of the first command within the command buffer based on the beginning index, end index, the command buffer index, and the ring index; and
store the location;
wherein the command processor is configured to execute the second command for a time quantum;
wherein the buffer controller notifies the command processor when to resume execution of the first command after the time quantum lapses; and
wherein the command processor resumes execution of the first command based on the stored determined location.

20. The computer system of claim 19, further comprising at least one ring buffer, the ring buffer including the two or more command buffers.

21. The computer system of claim 20, wherein the ring buffer, the command processor, and the buffer controller are included within at least one from the group including a graphics processing unit (GPU) and a central processing unit (CPU).

* * * * *

UNITED STATES PATENT AND TRADEMARK OFFICE
CERTIFICATE OF CORRECTION

PATENT NO. : 8,743,131 B2
APPLICATION NO. : 12/878519
DATED : June 3, 2014
INVENTOR(S) : McCrary et al.

Page 1 of 1

It is certified that error appears in the above-identified patent and that said Letters Patent is hereby corrected as shown below:

In the Claims

Column 12

Claim 19, Line 50 please replace "ring index" with --ring buffer index--.

Signed and Sealed this
Thirtieth Day of September, 2014

Michelle K. Lee
*Deputy Director of the United States Patent and Trademark Office*